Feb. 15, 1927.　　　　　　　　　　　　　　　　　　1,618,040
P. ALGRAIN
AXLE FOR TRAMWAY, RAILWAY, AND OTHER VEHICLES
Filed Oct. 7, 1926
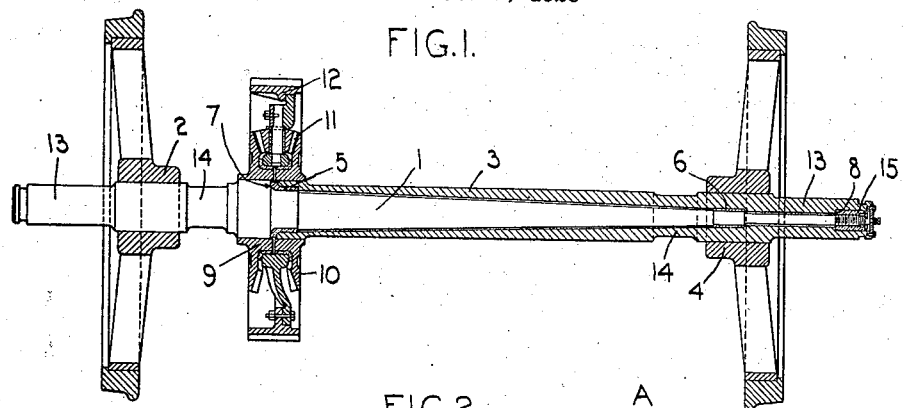
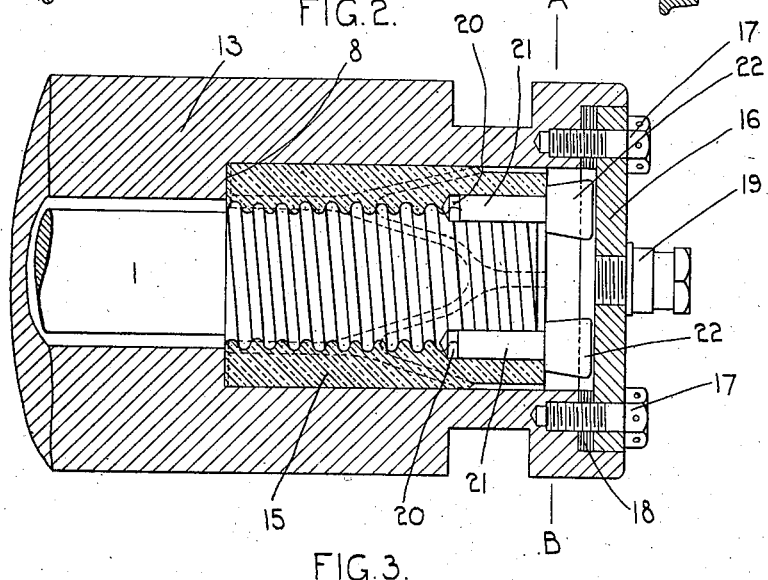
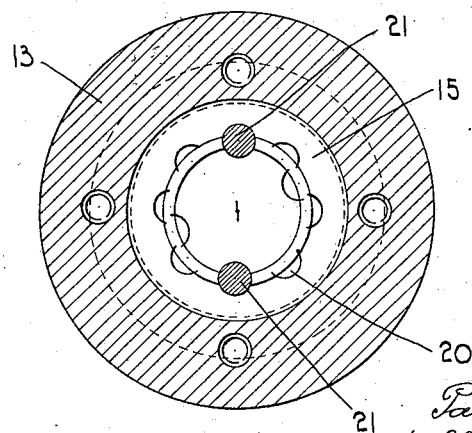
Inventor,
Paul Algrain
by Herbert W. Jenner,
Attorney Patented Feb. 15, 1927.

1,618,040

UNITED STATES PATENT OFFICE.

PAUL ALGRAIN, OF LA CROYERE, BELGIUM.

AXLE FOR TRAMWAY, RAILWAY, AND OTHER VEHICLES.

Application filed October 7, 1926, Serial No. 140,116, and in Great Britain October 9, 1925.

The invention has reference to axles for the wheels of tramway vehicles and other railway vehicles, but is applicable also to the axles of the wheels of other vehicles.

In rail vehicles actually in use, the wheels are generally secured to a one-piece (usually solid) axle with the result that when the vehicle is travelling on a curved part of the track the outside wheels slide or grind on the rail and energy is thus absorbed and wasted; further, this sliding or grinding of the outside wheels results in objectionable wear of the rail and of the wheel tyres and flanges and puts a torsional strain on the axle which may result in fracture of the same. Moreover, the sliding or grinding of the wheels on the rail is objectionable because it results in discomfort of the passengers in the vehicle. To avoid the above-mentioned disadvantages axles have been proposed comprising a male member and a female member on each of which a wheel is fixed, the said members fitting the one within the other and freely rotatable relatively to each other and it is to this type of axle that the present invention relates.

According to the invention longitudinal displacement of the male and female members relatively to each other is prevented by abutments one of which is constituted by a cylindrical body located within the female member and capable of easy accurate adjustment and is associated with suitable means whereby it is locked after adjustment. In order to provide for efficient lubrication the axle is formed with lubricant channels or grooves extending along the cylindrical abutment member and bearing sleeves interposed between the male and female members so that all parts rotating relatively to each other can be fed with lubricant under pressure.

In the case of a driven axle, power is transmitted to the two members of the axle by a differential gear located between the wheels thereof.

Fig. 1 of the accompanying drawings illustrates in longitudinal sectional elevation a wheel axle embodying the invention.

Fig. 2 is a sectional view, to a larger scale than Fig. 1, of the right hand end of the axle shown in Fig. 1, and, Fig. 3 is a transverse section corresponding to the line A, B, of Fig. 2.

The axle illustrated by way of example is a driven axle and the driving means shown consists of a differential gear comprising a spur wheel, but it will be understood the drive could be effected by bevel or helicoidal toothed wheel or any other suitable drive transmitting gear. It is also to be noted that the position of the differential gear relatively to the rail wheels of the axle is unimportant and that in the case of a non-driven axle the differential gear is omitted.

The axle illustrated comprises a male and female member the male member 1 having a cylindrical portion on which is fixed the wheel 2, and a truncated conical portion. The female or tubular member 3 on which is secured the other wheel 4, embraces the tapered portion of the male member 1 and it is preferably of cylindrical form on its exterior whilst its interior or bore is of conical form to correspond with the tapered portion of the male member.

Two bearing sleeves 5 and 6 located at the two ends of the tapered portion of the male member effect the transversal reciprocal supporting of the male and female members of the axle. This method of supporting the male and female members of the axle enables the said two members to be given cross sections of equal resistance and of complementary shapes fitting into each other so that the size and weight of the complete axle do not exceed those of an ordinary one-piece axle.

Longitudinally the female or tubular member abuts at its inner end against a shoulder 7 of the male member, through an interposed outwardly extending flange of the bearing sleeve 5, and at its other end longitudinal movement is prevented by a cylindrical abutment nut 15 screwed on a threaded portion of the outer end of the male member 1, the inner end of said nut bearing against an internal shoulder 8 formed therefor in the bore of the female member 3.

Efficient lubrication of the said bearings and abutments is effected under pressure and for this purpose the outer end of the female member 3 is closed tightly by a cover plate 16 secured thereto by screws 17, a jointing ring 18 of suitable material being interposed. Fitting centrally in the cover plate 16 is a fitting 19 through which lubricant may be forced under pressure into the space between the end of the cylindrical nut 15 and the cover plate 16. From this space the lubricant flows along channels formed by grooves in the periphery of the nut 15, see the dotted lines in Fig. 2, the ends of these channels communicating with radial grooves formed in the inner end of the nut 15. From these radial grooves lubricant passes into the annular space between the cylindrical extremity of the male member 1 and the female member. The bearing sleeve 6 secured on the male member at the outer end of the tapered portion thereof is, in like manner to the cylindrical nut 15, formed with peripheral and radial grooves which allow the passage of the lubricant to the space between the tapered portion of the male member 1 and the corresponding conical bore of the female member 3. The bearing sleeve 5 at the larger end of the tapered portion of the male member is similarly formed with peripheral and radial grooves which allow the lubricant to pass to the surface of contact of the hub of the spur driving wheel 12 and the lubricant then serves to lubricate the gears of the differential. The differential gear may be enclosed in a suitable lubricant-tight casing not shown.

For the purpose of enabling the cylindrical nut 15 to be conveniently adjusted and to lock the said nut after adjustment locking means are provided. A series of holes 20 is bored partly in the nut and partly in the end portion of the male member 1, see Fig. 3. These holes receive pins 21 which lock the nut against rotary movement. The half holes bored in the extremity of the male member 1 are disposed on two diameters the angles of which are so chosen as to enable the nut to be adjusted with great accuracy. The pins 21 are prevented from moving endwise by heads 22 with which the pins are furnished abutting against the cover plate 16.

The differential gear illustrated in the drawing comprises a driving spur wheel 12 to which power is transmitted from the motor-shaft, two sun wheels 9 and 10 fixed one on the male member 1 of the axle and the other on the female member 3 thereof, and planet pinions 11 whose radial axles are mounted on the spur wheel 12.

The vehicle may be supported on the axle either by outer journals 13 or by inner journals 14 or by both.

In details of construction modifications may be made without departure from the invention, and whilst the improved axle is principally applicable to railway and tramway vehicles it may also be used with advantage on motor-cars and other vehicles as will be understood.

What I claim is:—

1. An axle for the rolling stock of tramway, railway and other vehicles, comprising a female member, a male member mounted to rotate freely within said female member, wheels fixed one on said male member and one on said female member, abutments that prevent relative longitudinal movement of said male and female members one of said abutments being constituted by a cylindrical body adjustable within said female member, and means adapted to lock said adjustable abutment after adjustment thereof.

2. An axle for the rolling stock of tramway, railway and other vehicles, comprising a female member, a male member mounted to rotate freely within said female member, wheels fixed one on said male member and one on said female member, abutments that prevent relative longitudinal movement of said male and female members one of said abutments being constituted by a cylindrical nut screwed on said male member within female member, and means adapted to lock said adjustable abutment after adjustment thereof.

3. An axle for the rolling stock of tramway, railway and other vehicles comprising a male member having a cylindrical portion on which one of the wheels is fixed and a truncated conical portion embraced by a female or tubular member on which the other wheel is secured, the said female member having a tapered bore corresponding to that of the conical portion of the male member and being supported on the male member by bearing sleeves located one at each end of the tapered portion of the male member, and relative longitudinal movement of the male member and female member being prevented by a shoulder formed on the male member against which the inner end of the female member abuts and by an internal shoulder on the female member against which abuts a cylindrical nut screwed on the end portion of the male member.

4. An axle as claimed in claim 1 constructed with lubricant channels or grooves extending along the cylindrical abutment member and bearing sleeves interposed between the male and female members so that all parts rotating relatively to each other can be fed with lubricant under pressure.

5. An axle as claimed in claim 1 arranged as a driven axle to which the drive is transmitted through differential gear connected to the said male and female members between the said wheels that are fixed thereon.

6. An axle as claimed in claim 3 comprising an end plate that closes the outer end of the female member, a fitting carried by said end plate and through which lubricant can be forced under pressure to the bore of the said female member and thence to all relatively rotating parts of the axle and to differential gear, if any, mounted thereon.

7. An axle as claimed in claim 2 wherein the means for locking the adjustable abutment nut comprise pins adapted to engage holes of which a series is bored partly in the said nut and partly in the end portion of the said male member, endways movement of said pins being prevented by the heads thereof abutting against a cover plate that closes the outer end of the said female member.

8. An axle comprising a central axle member provided with a journal and a road wheel, a tubular axle member rotatable on the central axle member and also provided with a journal and a road wheel and having an internal shoulder at one end portion, a plate closing the said end portion, and an abutment member secured to the central axle member and arranged between the said shoulder and plate.

9. An axle as set forth in claim 8, and provided also with means for adjusting the bearing of the ends of the abutment member with relation to the said shoulder and plate.

10. An axle comprising a central axle member provided with a journal and having a road wheel secured on one end portion and having its other end portion tapered, a tubular axle member also provided with a journal and having a road wheel secured on one end portion and having its other end portion correspondingly tapered so as to slide over the tapered part of the central axle member, and means arranged between the said axle members and preventing them from sliding with respect to each other.

In testimony whereof I affix my signature.

PAUL ALGRAIN.